(12) United States Patent
Nawaby et al.

(10) Patent No.: US 9,045,611 B2
(45) Date of Patent: Jun. 2, 2015

(54) PROCESS FOR PREPARING A HEAT RESISTANT POLYLACTIC ACID FOAMED ARTICLE

(75) Inventors: A. Victoria Nawaby, Southlake, TX (US); Eric Kragness, Sinking Spring, PA (US); Robert Babrowicz, Spartanburg, SC (US); Natarajan S. Ramesh, Grapevine, TX (US); Nilesh Amrutiya, Vadodara (IN); Eugenio Longo, Rho (IT)

(73) Assignee: Cryovac, Inc., Duncan, SC (US)

( * ) Notice: Subject to any disclaimer, the term of this patent is extended or adjusted under 35 U.S.C. 154(b) by 127 days.

(21) Appl. No.: 13/040,632

(22) Filed: Mar. 4, 2011

(65) Prior Publication Data

US 2012/0223459 A1 Sep. 6, 2012

(51) Int. Cl.
| | | |
|---|---|---|
| *B29C 51/08* | (2006.01) | |
| *C08J 9/36* | (2006.01) | |
| *B29C 51/00* | (2006.01) | |
| *B29K 105/04* | (2006.01) | |

(52) U.S. Cl.
CPC .............. *C08J 9/36* (2013.01); *B29C 51/002* (2013.01); *B29K 2105/04* (2013.01); *C08J 2367/04* (2013.01); *B29K 2995/004* (2013.01)

(58) Field of Classification Search
USPC .......... 264/46.8, 322, 496, 645, 663, 77, 240, 264/241, 331.12, 664, 332, 320, 321, 36.11, 264/48, 628
See application file for complete search history.

(56) References Cited

U.S. PATENT DOCUMENTS

| | | | |
|---|---|---|---|
| 7,449,510 B2 | 11/2008 | Ueda et al. | |
| 7,901,764 B2 | 3/2011 | Takase et al. | |
| 2003/0038405 A1 | 2/2003 | Bopp et al. | |
| 2007/0293593 A1 | 12/2007 | Harfmann | |
| 2008/0050603 A1 | 2/2008 | Randall et al. | |
| 2008/0146686 A1 | 6/2008 | Handa | |
| 2008/0262118 A1 | 10/2008 | Cink et al. | |
| 2009/0258175 A1 | 10/2009 | Matsuoka et al. | |
| 2009/0278279 A1* | 11/2009 | Uradnisheck | 264/210.1 |
| 2009/0311511 A1* | 12/2009 | Obuchi et al. | 428/323 |
| 2010/0028654 A1 | 2/2010 | Takase et al. | |
| 2010/0081176 A1 | 4/2010 | Takubo | |
| 2010/0152415 A1 | 6/2010 | Benson | |
| 2011/0263732 A1 | 10/2011 | Ramesh et al. | |

FOREIGN PATENT DOCUMENTS

| | | |
|---|---|---|
| EP | 2 135 724 A1 | 12/2009 |
| EP | 2 380 922 A1 | 10/2011 |
| WO | WO 2006/038548 A1 | 4/2006 |
| WO | WO 2008/057214 A2 | 5/2008 |
| WO | WO 2008/130226 A2 | 10/2008 |
| WO | WO 2008/146686 A1 | 12/2008 |

OTHER PUBLICATIONS

Extended European Search Report for European Patent Application No. 11163522.3, dated Aug. 31, 2011.
Database WPI—Week 200964—Thomson Scientific, London, GB; AN 2009-H37923 & KR 2009 0008899 A (Jeong J) Jan. 22, 2009 & Computer Generated Translation.
International Search Report/Written Opinion for Application No. PCT/US2012/027186 dated Jun. 21, 2012.

* cited by examiner

*Primary Examiner* — Stella Yi
(74) *Attorney, Agent, or Firm* — Alston & Bird LLP

(57) ABSTRACT

Some embodiments of the present invention provides a method of preparing a thermoformed article composed of polylactic acid that includes the steps of providing a foam sheet comprising polylactic acid having a D-lactic acid stereo-isomer content that is about 3 mole % or less, exposing the sheet to a temperature of at least about 190° C., and forming the heated sheet in a mold at a mold temperature that is at least about 50° C. and for a length of time to form a thermoformed article having a PLA crystalline content of at least about 10%. Surprisingly, it has been discovered that heat resistant thermoformed articles can be prepared in accordance with embodiments of the invention wherein the time required for forming the foam sheet into a molded article is less than about 10 seconds.

22 Claims, No Drawings

PROCESS FOR PREPARING A HEAT RESISTANT POLYLACTIC ACID FOAMED ARTICLE

BACKGROUND

Traditionally, many packaging materials are prepared from thermoplastic polymers, such as polystyrene, polyethylene, and polypropylene. These polymers are generally very stable and can remain in the environment for a long time. Recently, however, there has been a trend to develop articles and products that are considered environmentally friendly and sustainable. As part of this trend, there has been a desire to produce ecologically friendly and biodegradable packaging products.

One promising polymer that may meet this desire is polylactic acid (PLA). Polylactic acid, also known as polylactide, is a biodegradable, thermoplastic, aliphatic polyester derived from renewable resources, such as sugar, starch, or cellulose. PLA is promising because it is manufactured from natural substances, such as corn, and therefore may provide a sustainable alternative to petrochemical-derived products.

However, PLA has several disadvantages that have limited its use in packaging and other applications. In particular, thermofoamed articles comprising PLA resins may be dimensionally stable (i.e., heat resistant) at temperatures up to only about 49° C. This low dimensional stability at elevated temperatures can be particularly problematic during summer months when temperatures to which packaging articles comprising PLA may be exposed to relatively high temperatures during storage or transportation.

Several approaches have been developed to address these problems. One approach includes the use of a crosslinking agent, such as peroxide, in the foam. For example, crosslinking the foam matrix can help to increase the extensional viscosity (melt strength) of the polymer and minimize cell wall collapse. Other approaches include blending PLA with one or more additional polymer resins, such as styrene or a polyolefin. However, the addition of crosslinking or other non-biodegradable polymers in the foam reduces the ability of the foam to decompose. Further, inducing crosslinking in the foam generally requires an additional step which can add to the complexity and cost of producing the foam.

In addition, common traditional methods of preparing thermoformed PLA articles require a two-step molding process in which a heated PLA foam sheet is first subjected to a hot mold step followed by a cold mold step. In the hot mold step, the heated PLA foam sheet is introduced into a hot mold that is heated to at least 100° C. While in the hot mold, the foam sheet is molded to a desired shape and configuration. In addition to shaping the article, the hot mold step also induces crystallization into the PLA foam. In a second step, the thus molded foam is transferred to a cold mold that "freezes" the foam into the desired shape. The temperature of the cold mold is typically less than 30° C. Generally, to improve the dimensional stability of the thermoformed article, the PLA foam is exposed to the hot mold for an amount of time to induce a sufficient amount of crystallization in the PLA foam so as to improve heat resistance of the molded article. For example, in some cases it may be necessary to expose the PLA foam to the hot mold for at least 15 seconds. As a result, longer production times are generally needed to prepare heat resistant PLA foamed articles.

Accordingly, a need still exists for improved methods of preparing PLA foams having improved properties.

BRIEF SUMMARY

One or more embodiments of the present invention addresses one or more of the aforementioned problems. In particular, the present invention provides a method of preparing a thermoformed article comprising polylactic acid comprising the steps of providing a foam sheet comprising polylactic acid having a D-lactic acid stereo-isomer content that is about 3 mole % or less, exposing the sheet to a temperature of at least about 190° C., and forming the heated sheet in a mold at a mold temperature that is at least about 50° C. and for a length of time to form a thermoformed article having a PLA crystalline content of at least about 10%, and in some embodiments, a PLA crystalline content of at least about 20%.

Surprisingly, it has been discovered that heat resistant thermoformed articles can be prepared in accordance with embodiments of the invention wherein the step of forming the heated sheet in a heated mold can be completed in less than about 10 seconds. In addition, embodiments of the present invention also provide for a process of preparing a heat resistant PLA thermoformed article in the absence of a cold mold step.

In one embodiment, PLA thermofoamed articles can be prepared that exhibit heat resistance above a temperature of about 49° C. or more, and in particular, a heat resistance in excess of about 74° C. or more. Embodiments of the present invention can be used to prepare a variety of different thermoformed articles such as trays.

In one embodiment, the step of providing a foam sheet may include providing a PLA foam sheet comprising a polylactic acid (PLA) resin having a D-lactic acid content that is about 3 mole % or less, and wherein the PLA foam is substantially free of crosslinking or a crosslinking agent.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

Embodiments of the present invention include a method of preparing a thermoformed article having improved heat resistance comprising the step of forming a heated sheet comprising polylactic acid having a D-lactic acid stereo-isomer content that is about 3 mole % or less in a mold at a mold temperature that is at least about 50° C. and for a length of time of less than 10 seconds to form a thermoformed article having a PLA crystalline content of at least about 10%.

Embodiments of the present invention may also provide a method of preparing PLA thermoformed articles that can be completed in the absence of an additional step in which the thermoformed article is treated with a cold mold that "freezes" the molded foam into the desired shape. In other words, embodiments of the present method can be completed in a 1-step molding process in which a heated PLA foam sheet is subjected to a single hot mold step to shape and mold the foam sheet, and is not subjected to a subsequent cold mold treatment.

As discussed in greater detail below, the PLA foam sheet may be prepared from a foam precursor mixture (i.e., a foamable premixture) comprising a polylactic acid resin having a D-lactic acid content that is about 3 mole % or less, a nucleating agent, and a blowing agent. In one embodiment, the foam precursor mixture is substantially free of a crosslinking agent, and hence, the resulting PLA foam sheet is also substantially free of crosslinking. In some embodiments, the foam precursor mixture may also include a chain extender agent.

Suitable PLA polymers that can be used in the practice of embodiments of the invention include PLA polymers having a D-lactic acid stereo-isomer content that is about 3 mole % or less, and in particular, a D-lactic acid stereo-isomer content that is about 2 mole % or less. An example of a suitable PLA polymer is PLA 4032D grade, which has a D-lactic acid stereo-isomer content of about 2 mole %, and is produced by NatureWorks LLC under the trade name INGEO NATURE WORKS®. The percent of PLA polymer in the foam precursor mixture, or in the foam, may be any combination of at least about 85 weight percent, at least about 90 weight percent, at least about 94 weight percent, and at most about 98 weight percent, based on the total weight of the composition, for example, from about 90 to about 98 weight percent, and from about 94 to about 98 weight percent.

PLA foams in accordance with embodiments of the present invention can be prepared using conventional methods and extrusion equipment as are known to those of ordinary skill in the art. For example, a PLA foam in accordance with the present invention can be prepared by melt processing the PLA resin with a nucleating agent, blowing agent, and chain extender agent (when present) in an extruder to form a pressurized molten mixture.

In the extrusion process, the PLA resin may be heated to a temperature at or above its glass transition temperature or melting point. Suitable temperatures are at least about 160° C., and more typically at least 170° C. The hydrocarbon blowing agent may be introduced under pressure and mixed into the heated PLA resin. The nucleating and chain extending agents may optionally be blended into the melt as noted above. Pressures during the mixing step may be maintained high enough so that foam expansion does not begin until the molten mixture passes through the extrusion die.

In one embodiment of the invention, a PLA foam sheet having a D-lactic acid stereo-isomer content that is about 3 mole % or less is exposed to a temperature of at least about 190° C. to heat the foam sheet. In one embodiment, the foam sheet may by exposed to a temperature of at least about 190° C. by exposing the sheet to a heat source, such as an oven, heated air, infrared heater, or the like. In certain embodiments, the foam sheet is introduced into an oven that is maintained at an oven temperature that is sufficient to soften the PLA foam sheet and induce molecular relaxation of the PLA polymer chains. In one embodiment, the oven temperature is from about 190° C. to 250° C., and in particular, from about 200° C. to 250° C. For example, in some embodiments the oven temperature is maintained at about 210° C. to 250° C., which is well above the glass transition temperature of the PLA polymer and below the crystalline melt point of the polymer. In one embodiment, the PLA foam sheet is introduced into an oven at an oven temperature that is from about 215° C. to 246° C. The PLA foam sheet is maintained in the oven for at least about 1 second, and in particular, from about 1 to 5 seconds. A continuous or batch process can be used to expose the foam sheet to a temperature of at least about 190° C.

Following treatment in the oven, the heated PLA foam sheet subjected to a hot mold treatment step in which the heated foam sheet is molded and formed into a thermoformed article having a desired shape. The hot mold is generally maintained at a mold temperature that is at least about 50° C. In one embodiment, the hot mold is maintained at a mold temperature that is from about 52° C. to 96° C., and in particular, from about 54° C. to 66° C. In some embodiments, the hot mold step may be conducted with the assistance of a vacuum as is known to one of skill in the art.

In one embodiment, the PLA foam sheet is maintained in the hot mold for an amount of time to induce sufficient crystallization into the PLA polymer so as to provide a PLA thermoformed article having a PLA crystalline content of at least 10%. For example, the PLA crystalline content of the PLA thermoformed article is at least greater than about 10%. In one embodiment, the crystalline content of the PLA thermoformed article prepared may be at least about any of the following: 10%, 15%, 20%, and 25%; and at most about any of the following: 35%, 40%, and 45%, for example, ranging from any of about 10 to about 40%, from about 20 to about 45%, and from about 25 to about 35%. For example, the PLA foam sheet may be maintained in the hot mold for at least about 1 seconds, and in particular, from about 1 to 5 seconds.

As noted above, embodiments of the present invention provide for a method of preparing a thermoformed PLA article in which the total cycle time for heating and molding the PLA foam sheet is less than about 10 seconds, and in particular less than about any one of the following: less than about 9 seconds, less than about 8 seconds, less than about 7 seconds, less than about 6 seconds, less than about 5 seconds, and less than about 4 seconds.

The inventors of the present invention have discovered that the use of PLA polymers having relatively short crystallization half-times, such as less than 15 seconds, can be used to prepare thermoformed PLA articles having good heat resistance, and that can be prepared in relatively short total form time, for example, less than 10 seconds. The crystallization half-time of the PLA polymer is calculated from the following equation:

$$t_{1/2} = (\ln 2/k)^{1/n}$$

which is derived from the Avarami equation is as follows:

$$\ln(1-X_c) = kt^n$$

where Xc is % crystallinity at 50% crystallinity or $X_c = \frac{1}{2}$, t is the time, k and n are Avarami parameters. In one embodiment, the PLA polymer has a crystalline half time that is from about 5 to 15 seconds, and in particular, from about 6 to 12 seconds. In one embodiment, the PLA polymer has a crystalline half time that is from about 6 to 10 seconds. PLA 4032D grade produced by NatureWorks LLC under the trade name INGEO NATURE WORKS® is an example of a PLA polymer having a relatively short crystallization half-time.

Embodiments of the present invention also provide for thermoformed PLA articles having improved heat resistance. The "heat resistance" of a foamed article in accordance with the invention is determined by placing the article on an oven rack inside an oven pre-heated to a selected oven temperature at which the heat resistance is to be evaluated. If the foam article maintains dimensional stability for a selected amount of time of exposure, then the article is considered to have a "heat resistance" at the oven temperature (reported with the selected amount of time of exposure). In the present invention, the heat resistance of a molded article was determined by placing a foam tray (8.5" L×6" W×1" H) on a solid metal rack within the preheated oven. The article was then visibly observed with the naked eye for a selected amount of time for the occurrence of structural deformities.

Embodiments of foams of the present invention exhibit good heat resistance, for example, thermoformed PLA foam trays had a heat resistance of 66° C. (exposure for 5 minutes). Foam trays that have a heat resistance of at least 66° C. after 5 minutes of exposure are considered to have good heat resistance. Thermoformed articles in accordance with embodiments of the present invention may have a heat resistance (after 5 minutes of exposure) of at least about any of the following: 66° C., 70° C., 74° C., 75° C., 80° C., 85° C., 90° C., 95° C., and 99° C. Advantageously and surprisingly, a method of preparing a thermoformed PLA article having improved heat resistance can be obtained in the absence of substantial crosslinking agent of the PLA polymer, and/or that is substantially free of polymer resin derived from petrochemicals. Additionally, thermoformed PLA articles having improved heat resistance can be obtained in the absence of an extended molding process and/or a two-step molding process to induce crystallization in the PLA polymer.

Thermoformed PLA articles in accordance with embodiments of the present invention may exhibit a heat resistance from about 45 to about 100° C., and in particular, from about 74 to about 99° C. at 5 minutes of exposure. In one embodiment, a thermoformed PLA article of the present invention has a heat resistance of at least about 99° C. at 5 minutes of exposure.

PLA foam sheets in accordance with embodiments of the present invention may have a density of less than about any of the following: 6.24 pounds/cubic foot (0.1 g/cm$^3$), 5 pounds/cubic foot (pcf) (0.08 g/cm$^3$), and 4 pcf (0.06 g/cm$^3$), as measured according to ASTM D-3575. In some embodiments, the PLA foam has a density less than about 0.1 g/cm$^3$, such as from about 2 to 5 pcf (0.032-0.08 g/cm$^3$). Foams in accordance with embodiments of the present invention can also be characterized by cell count and size. For example, the PLA foam may have an average cell size of at least about any of the following: 0.2 mm, 0.3 mm, 0.6 mm; and/or at most about 1 mm.

As briefly discussed above, the PLA foam sheets that may be used in accordance with the present invention may include PLA polymers having a D-lactic acid stereo-isomer content that is about 3 mole % or less, and in particular, a D-lactic acid stereo-isomer content that is about 2 mole % or less. In addition, the PLA foam sheets may be prepared from a foam precursor mixture that also comprises a nucleating agent, a chain extender, and a blowing agent, and that is substantially free of a crosslinking agent.

Suitable nucleating agents for use in embodiments of the present invention may include inorganic nucleating agents and organic nucleating agents. Useful inorganic nucleating agents include talc, calcium carbonate, calcium silicate, indigo, clay, mica, kaolin, titanium dioxide, and silica. Useful organic nucleating agents include metal salts of fatty acids, such as zinc stearate and calcium stearate. The nucleating agents may be used alone or in combination. A suitable organic nucleating agent is PLA na S516 available under the trade name SUKANO®. In one embodiment, the foam includes a combination of talc and an organic nucleating agent, such as PLA na S516.

The nucleating agent may be present in an amount from about 0.1 to 10 weight percent based on the total weight of the polylactic acid resin, and in particular from about 0.1 to 5 weight percent, based on the total weight of the polylactic acid resin. In one embodiment, the nucleating agent is present in an amount from about 0.1 to 2 weight percent based on the total weight of the polylactic acid resin. In one particular embodiment, the nucleating agent comprises talc, which is present in an amount from about 0.25 to 0.3 weight percent based on the total weight of the polylactic acid resin.

PLA foams that may be used in embodiments of the present invention may be prepared from a foam precursor mixture comprising a blowing agent in at least about, and/or in at most about, any of the following amounts based on the total weight of the foam precursor mixture: 2, 3, 4, 5, 6, 7, 8, 9, and 10%. For example, the foam precursor mixture may comprise from about 3 to about 7 wt. % blowing agent. The blowing agent used for the foam precursor mixtures and in the production of PLA foams may comprise one or more hydrocarbon blowing agents having from 1 to 8 carbons. Suitable hydrocarbon blowing agents include propane, n-butane, iso-butane, n-pentane, isopentane, hexane, heptane, octane and combinations thereof. In one embodiment, the blowing agent comprises a blend of n-pentane and iso-butane in an 80/20 weight % ratio. The blowing agent may comprise from about 70 to about 90 weight percent of a relatively heavier weight hydrocarbon blowing agent and from about 10 to about 30 weight percent of a relatively lighter weight hydrocarbon blowing agent, based on the total weight of hydrocarbon blowing agent, for example, from about 70 to about 90 wt. % n-pentane and from about 10 to about 30 wt. % iso-butane. In one embodiment, the blowing agent may comprise iso-butane. In some embodiments, the foam precursor mixture may comprise a non-hydrocarbon blowing agent (e.g., inert gas blowing agent such as carbon dioxide in gaseous or super critical fluid form or nitrogen) alone or in combination with the hydrocarbon blowing agent or alternative to the hydrocarbon blowing agent.

Foam precursor mixtures used to prepare the PLA foam sheets may also include a chain extender agent (i.e., chain extender). The chain extender in combination with the other components of the precursor foam mixture helps to increase the viscosity and melt strength of the foam precursor mixture to facilitate a foam structure having increased melt strength, higher cell densities and smaller cells. Suitable chain extenders that may be used in embodiments of the present invention include epoxy-based chain extenders, for example, an epoxy-based chain extender available from Clariant under the trade name CESA® Extend Omans 698493. The amount of chain extender agent may range, for example, from about 0.5 to about 5 weight %, or from about 0.5 to about 4 weight percent, or from about 0.5 to about 1 weight percent, based on the total weight of the foamable composition. In one embodiment, the amount of chain extender is from about 2 to about 2.5 weight percent, based on the total weight of the foamable composition, and in particular, about 2.35 weight percent. Although it may be possible for a chain extender to induce some crosslinking in the foam, this is not the primary function of a chain extender, and is only incidental to the primary function of the chain extender, which is to chemically attach to the PLA polymer in order to extend the polymer chain, thereby increasing viscosity and melt strength. Accordingly, the phrase "substantially free of a crosslinking agent" used in characterizing the foam precursor mixture or the foam means that the mixture or foam lacks an agent having a primary function of crosslinking the PLA chains. Thus, a chain extender is not a crosslinking agent and the foam precursor mixture and the foam may be "substantially free of crosslinking agent" if the mixture or foam includes chain extender agent and lacks crosslinking agent.

The foam precursor mixture and foam may comprise additives of the type and at the concentration conventionally used in the manufacture of foams. These additives may be present in the mixture at a concentration of about 0.05 to about 3 percent by weight of the total composition. Examples of suitable additives include fillers, pigments, antioxidants, UV stabilizers, thermal stabilizers, flame retardants, slip agents, antistatic agents, antimicrobial agents, photostabilizers, lubricants, antiblocking agents, smoke suppressants, and surfactants.

The inventive method can be used to prepare a variety of different PLA thermoformed articles including cutlery, such as spoons, forks, knives, etc., food packaging articles, such as cartons, trays, containers, etc., insulative materials, building materials, composite and laminate foam materials, and the like.

The invention may be further understood by reference to the following examples, which are provided for the purpose of representation, and are not to be construed as limiting the scope of the invention.

EXAMPLES

In the following examples, PLA foam sheet samples were prepared using an extruder. The materials used in the foams are identified below. All percentages are weight percents unless indicated otherwise. All physical property and compositional values are approximate unless indicated otherwise "PLA-1": a polylactic acid polymer resin having a D-lactic acid content of 4 mole %, a density of 1.25 g/cm$^3$, and that is available from NatureWorks LLC under the tradename INGEO NATUREWORKS® grade 3051D;

"PLA-2": a polylactic acid polymer resin having a D-lactic acid content between about 1.4 to 2 mole % and that is available from NatureWorks LLC under the tradename NATUREWORKS® grade 4032D;

"TALC": Talc nucleating agent available from Polyvel S1418.

"CE": CESA® Extend Omans 698493: a chain extending agent that is available from Clariant;

"PB-1": iso-butane hydrocarbon physical blowing agent available from Exxon Mobil;

In Comparative Sample 1, PLA-1 and the other components identified in Table 2 were fed into a tandem extruder with a throughput loading capacity of 60 kg/hour. The polymer was melted, mixed with all components, and then cooled at a melt temperature of about 145° C. Iso-butane was used as the blowing agent to produce the foam sheet samples. The foams were extruded into a foam sheet having a thickness of 4 mm (0.15 inch).

In Example 1, PLA-2 and the other components identified in Table 2 were fed into a tandem extruder with a throughput loading capacity 60 kg/hour. The polymer was melted, mixed with the other components and cooled to about 160° C. Iso-butane was used as the blowing agent to produce the foam sheet samples. The foams were extruded into a foam sheet having a thickness of 4 mm (0.15 inch).

PLA resin properties, foam production processing parameters, and foam properties are summarized in TABLES 1 and 2 below.

TABLE 1

| | | | PLA Resin Properties | | | | |
|---|---|---|---|---|---|---|---|
| PLA RESIN | Resin Density (g/cm$^3$) | % D-LA content | Melt Index (g/10 min.) | Tg (° C.) | Tm (° C.) | ΔH (J/g) (recrystallization) | Heat Resistance (° C.) |
| PLA-1 | 1.25 | 4 | 10 | 55-65 | 150-165 | 39 | 49 |
| PLA-2 | 1.24 | ≤2 | 4 | 67 | 160 | 50 | 74-99 |

TABLE 2

| | | Foam Processing Parameters and Foam Properties | | | | | |
|---|---|---|---|---|---|---|---|
| Sample No. | Foam Formulation | Output rate (lbs/hour) | Die Pressure (psi) | Melt Processing Temperature (° C.) | Load Primary/Secondary (%) | Foam Density* (g/cm$^3$) | Cell Size (mm) |
| Comparative Sample 1 | 92.6% PLA-1; 2.35% CE; 0.4% TALC; 4.65% PB-1 | 130 | 1486 | 145 | 114/86 | 0.05 | 0.78 |
| Example 1 | 91.62% PLA-2; 2.35% CE; 0.23% TALC; 5.8% PB-1 | 120 | 1700 | 160 | 110/93 | 0.05 | 0.68 |

*Measured in accordance with ASTM D-3575.

Following extrusion, the PLA foamed sheets were aged for 2-3 days prior to being molded. Thermoforming was performed with an Irwin Model 28 thermoforming unit. Table 3 summarizes thermoforming conditions for Comparative Sample 1 and Example 1 in which the one-step process was used to thermoform the foam sheets. In the case of Comparative Sample 1, an oven temperature of 176.7° C. was maintained to prevent collapse of the foam. Additionally, it was found that applying higher thermoforming conditions to the PLA foam of Comparative Sample 1 results in foam collapse and possible burning of the PLA polymer. With respect to the mold temperature, a lower temperature was needed for Comparative Sample-1 to prevent deformation and collapse of the foam structure. Oven and mold temperatures were determined using the read out display on the thermoforming unit.

TABLE 3

Thermoforming Process Conditions

| Sample No. | Thermoforming Process | Oven Temperature (° C.) | Mold Temperature (° C.) | Heat Resistance to 66° (° C.) | Form time (sec.) |
|---|---|---|---|---|---|
| Comparative Sample 1 | 1-step | 176.7 | 21.1 | No | 4 |
| Example 1 | 1-step | 246.1 | 54.4 | Yes | 5 |

From Table 3 above, it can be seen that Comparative Sample 1 (having a % D-LA content of 4%) did not produce a thermoformed article having a heat resistance to 66° C. (5 minutes of exposure) when subject to the single step thermoforming process of the present invention. In contrast, the thermoformed PLA foam of Example 1 has a heat resistance of 66° C. (5 minutes of exposure) following being heated in an oven at a temperature of about 246.1° C., and then formed in a mold at a temperature of about 54° C. for a form time of about 5 seconds. Thus, it can be seen from Example 1, that embodiments of the present invention provide a method for preparing heat resistant PLA thermoformed articles that can be thermoformed in a form time of less than 10 seconds, and in particular, at a form time of about 5 seconds.

In Table 4 below, the crystallinity of the PLA foam before and after thermoforming was investigated for Comparative Sample 1 and Example 1. The crystalline content showed in columns 2 and 3 are for extruded sheets and was measured as set forth below. All references to the crystalline content of PLA foam are measured according to this method.

TABLE 4

Properties of Thermoformed PLA Foam

| Sample No. | PLA Crystalline content % | PLA crystalline content in thermoformed article % | Difference in tray crystalline content % | Heat Resistance (° C.) | Heat Resistance Improvement (° C.) |
|---|---|---|---|---|---|
| Comparative Sample 1 | 1.6 | 7.2 | N/A | 49 | N/A |
| Example 1 | 7.2 | 31 | 330.5 | 74-99 | 25-50 |

Thermal and crystalline properties were measured with a TA Instrument DSC Q2000.

The crystalline content of the samples was calculated by DSC (Differential Scanning calorimetry) is done by using the following steps:

1. Heating at 10° C./min is the standard speed up to some ten degrees after the melting peak;

2. Integrating the peaks getting the heat of fusion (J/g). The value of heat of fusion of 100% crystalline PLA material is approximately 93.7 J/g.

PLA Crystalline content was calculated by using the following formula:

$$\% \text{ Crystallinity} = \frac{\text{measured heat of fusion}}{\text{Heat of fusion of 100\% crystalline } PLA} \times 100\%$$

In the following Examples 2-7, various one-step mold process conditions were evaluated for foam sheets prepared in similar process as that described for Example 1. The foam sheets comprised 0.25% talc, 2.35% CE, from 5 to 6% PB-1, and the balance being PLA-2.

TABLE 5

One-step Thermoforming Conditions and Evaluation

| | Thermoforming conditions | | | | | |
|---|---|---|---|---|---|---|
| Example No. | Vacuum assist (sec.) | Oven Temperature (° C.) | Mold Temperature (° C.) | Form Cycle Time (sec.) | Foam Quality following Thermoforming | Heat Resistance (at least up to 66° C.) |
| Example 2 | 0 | 190.6 | 25 | 5 | Very Well | Not acceptable |
| Example 3 | 0.05 | 218.3 | 54.4 | 10 | Well | acceptable |
| Example 4 | 0.05 | 246.1 | 54.4 | 5 | Good | acceptable |
| Example 5 | 0.05 | 246.1 | 65.6 | 5 | Good | acceptable |
| Example 6 | 0.05 | 246.1 | 79.4 | 5 | Good | acceptable |
| Example 7 | 0.05 | 246.1 | 93.3 | 5 | Good | acceptable |

As can be seen in Table 5, Examples 2-7 were thermoformed under various conditions. As noted, the oven temperatures as well as the mold temperature may both play a significant role in preparing heat resistant thermoformed articles in relatively short form cycle times.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are That which is claimed:

1. A method of preparing a thermoformed article comprising polylactic acid, the method comprising the steps of:
    providing a foam sheet comprising polylactic acid having a D-lactic acid stereo-isomer content that is about 3 mole % or less, from about 0.1 to 5 percent by weight of nucleating agent, and from about 0.5 to about 4 percent by weight of a chain extender agent;
    exposing the sheet to a temperature of at least about 190° C.; and
    forming the heated sheet in a mold at a mold temperature that is 50° C. to 79.4° C. and for a length of time of less than 10 seconds to form a thermoformed article having a PLA crystalline content of at least about 10%, and wherein the steps of exposing the sheet and forming the heated sheet in the mold is completed in a total length of time of less than 10 seconds.

2. The method according to claim 1, wherein the form time for the forming steps is less than about 5 seconds.

3. The method according to claim 1, wherein the step of exposing the sheet to a temperature of at least about 190° C. comprised heating the sheet in an oven having an oven temperature is from about 190° to 250° C.

4. The method according to claim 3, wherein the oven temperature is from about 215° to 246° C.

5. The method according to claim 3, wherein the mold temperature is from about 52° to 65.6° C.

6. The method according to claim 1, wherein the process of preparing the thermoformed article is conducted in the absence of the step of subjecting the thermoformed article to a cold mold treatment.

7. The method according to claim 1, wherein the foam sheet is substantially free of crosslinking.

8. The method according to claim 1, wherein the thermoformed article is in the form of a tray.

9. The method according to claim 1, wherein the foam sheet comprises at least about 85 percent by weight of polylactic acid having a D-lactic acid stereo-isomer content that is about 3 mole % or less.

10. The method according to claim 1, wherein the foam sheet comprises from about 85 to 95 percent by weight of polylactic acid having a D-lactic acid stereo-isomer content that is about 3 mole % or less.

11. The method according to claim 1, wherein the foam sheet has a density of less than about 0.1 g/cm$^3$.

12. The method according to claim 1, wherein the thermoformed article resulting from the crystalline step has a crystalline content greater than about 25%.

13. A method of preparing a thermoformed article comprising polylactic acid, the method comprising the steps of:
    providing a foam sheet comprising polylactic acid polymer having a crystalline half life of from about 6 to 12 seconds;
    heating the sheet in an oven at an oven temperature that at least 190° C.; and
    forming the heated sheet in a mold at a mold temperature that is 50° C. to 79.4° C. and for a length of time of less than 10 seconds to form a thermoformed article having a PLA crystalline content of at least about 20%, wherein the steps of heating the sheet and forming the heated sheet in the mold is completed in a total length of time of less than 10 seconds, and wherein the foam sheet comprises
    from about 85 to 95 percent by weight of polylactic acid having a D-lactic acid stereo-isomer content that is about 3 mole % or less; and
    from about 0.1 to 5 percent by weight of nucleating agent;
    from about 0.5 to about 4 percent by weight of a chain extender agent; and
    wherein the foam has a heat resistance after 5 minutes of exposure of about 74° C. or more, and is substantially free of crosslinks formed by a crosslinking agent.

14. The method according to claim 13, wherein the time for the forming steps is less than about 5 seconds, and wherein the oven temperature is from about 190° to 250° C.

15. The method according to claim 13, wherein the mold temperature is from about 50° to 65.6° C.

16. The method according to claim 13, wherein the process of preparing the thermoformed article is conducted in the absence of the step of subjecting the thermoformed article to a cold mold treatment, a crosslinking agent and a synthetic polymer.

17. The method according to claim 13, wherein the foam sheet is substantially free of crosslinking.

18. The method according to claim 13, wherein the thermoformed article is in the form of a tray.

19. The method according to claim 13, wherein the nucleating agent is Talc.

20. The method according to claim 13, wherein the oven temperature is from about 215° to 246° C., and the mold temperature is from about 52° to 65.6° C.

21. The method according to claim 1, wherein a total cycle time for the steps of heating the sheet and forming the heated sheet in the mold is completed in a length of time of less than 8 seconds.

22. The method according to claim 1, wherein a total cycle time for the steps of heating the sheet and forming the heated sheet in the mold is completed in a length of time of less than 6 seconds.

* * * * *